United States Patent
Oliver et al.

[15] 3,694,989
[45] Oct. 3, 1972

[54] SUPPORT SPACERS FOR CONCRETE REINFORCEMENT RODS

[72] Inventors: Keith W. Oliver, Hadfield; Donald Taylor, Stalybridge, both of England

[73] Assignee: Celmac Plasclip Limited, Godley, Hyde, England

[22] Filed: Jan. 5, 1970

[21] Appl. No.: 555

[30] Foreign Application Priority Data

Jan. 16, 1969 Great Britain............2,611/69

[52] U.S. Cl. .......................52/678, 52/689, 52/688
[51] Int. Cl................................................E04c 5/20
[58] Field of Search ..52/677, 678, 687, 689; 248/50, 248/54, 67.5, 68, 72, 74 R

[56] References Cited

UNITED STATES PATENTS

| | | |
|---|---|---|
| 622,739 | 4/1899 | Wahlert...................248/74 |
| 1,241,126 | 9/1917 | Kidd........................248/74 |
| 2,625,354 | 1/1953 | Smith......................248/74 |
| 2,931,607 | 4/1960 | McFarland..............248/74 |
| 3,147,754 | 9/1964 | Koessler..................248/74 |
| 3,295,806 | 1/1967 | Modeme.................248/74 |
| 3,552,696 | 1/1971 | Orenick et al. ........248/68 R |
| 991,736 | 5/1911 | Minnick..................248/68 |
| 1,604,590 | 10/1926 | McNulty..................248/72 |
| 2,026,949 | 1/1936 | McMahan................248/50 |
| 2,915,267 | 12/1959 | Kaysing................248/67.5 |
| 3,255,565 | 6/1966 | Menzel....................52/687 |
| 3,292,335 | 12/1966 | Stober.....................52/687 |
| 3,300,930 | 1/1967 | Weise......................52/677 |
| 3,393,489 | 7/1968 | Oliver......................52/689 |
| 3,449,882 | 6/1969 | Ott et al..................52/689 |
| 3,471,987 | 10/1969 | Yelsma....................52/689 |

FOREIGN PATENTS OR APPLICATIONS

| | | |
|---|---|---|
| 699,892 | 8/1942 | Germany.................248/74 |
| 953,357 | 11/1956 | Germany.................248/74 |
| 932,190 | 7/1955 | Germany.................248/70 |
| 1,375,489 | 9/1964 | France....................52/677 |
| 1,270,774 | 6/1968 | Germany.................52/687 |
| 431,890 | 9/1967 | Switzerland.............52/687 |
| 434,659 | 10/1967 | Switzerland.............52/677 |

*Primary Examiner*—Frank L. Abbott
*Assistant Examiner*—Leslie A. Braun
*Attorney*—Norris & Bateman

[57] ABSTRACT

A spacer for concrete reinforcement rods of a plastics material comprising a U shaped support member having teeth on the legs of the member for engagement by teeth on a locking member to secure the reinforcement rod in position between the legs.

6 Claims, 9 Drawing Figures

SUPPORT SPACERS FOR CONCRETE REINFORCEMENT RODS

This invention relates to improvements in spacers of the kind produced from a plastics material for supporting reinforcement rods in concrete.

The object of the invention is to provide an improved method of fastening spacers to the reinforcement rods.

According to the invention a spacer for supporting reinforcement rods in concrete comprises a spacing member incorporating a U shaped member formed with teeth or projections for engagement by teeth or projections on a locking member for securing the reinforcement rod in position.

The invention will be described with reference to the accompanying drawings.

Figures 1, 2:
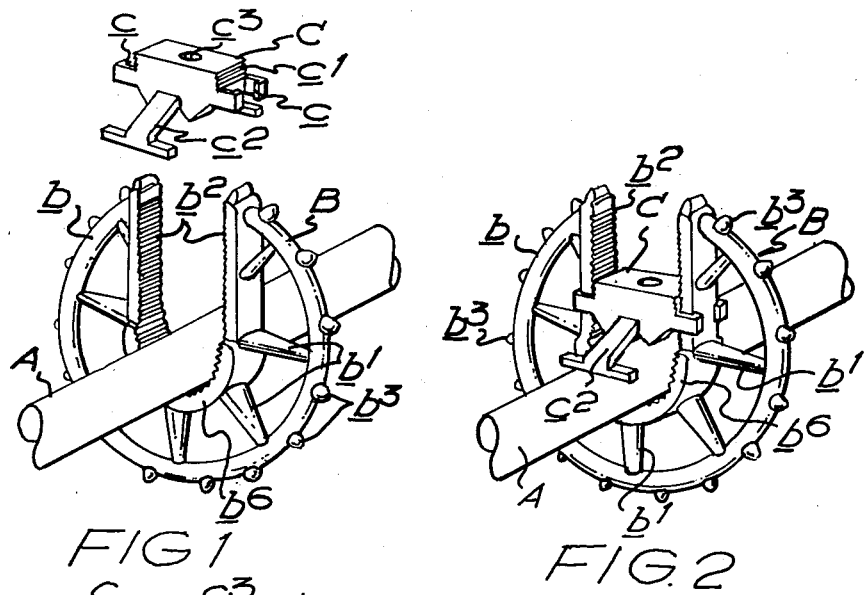
FIG. 1 is a perspective view of one form of spacer before securing a reinforcement rod therein by a locking or anchoring member.
FIG. 2 is a similar view of showing the spacer assembled on a reinforcement rod.

In the form shown in FIGS. 1 and 2 a reinforcement rod A is supported in a spacing member B moulded as a circular disc formed with a peripheral rim $b$ and radial spokes $b^1$ supporting a U shaped member $b^2$ to provide a slot in the disc extending from the peripheral rim $b$ of the disc through the center thereof and secured therein by the spokes $b^1$ and is shown with two substantially parallel legs extending from adjacent the center of the disc to the periphery thereof.

The peripheral rim $b$ is provided with a plurality of substantially triangular projections $b^3$ extending outwardly therefrom to form feet for supporting the disc B.

The inner surfaces of the U shaped member $b^2$ is moulded with serrations or teeth the sides of which slope away from the mouth of the member. The reinforcement rod A is inserted into the slot formed by the U shaped member $b^2$ and is secured therein by a locking member C.

The locking member C is moulded with a slot $c$ in each end to slide over the external surface of the U shaped member, the base of the slot in each end being moulded with a series of teeth $c^1$ corresponding with the teeth in the U shaped member $b^2$ in order that the locking stud or member C may be inserted into the U shaped member $b^2$ with the slotted ends $c$ enclosing the surfaces of the member $b^2$ with the teeth or serrations thereon in engagement with the teeth or serrations $c^1$ on the member C. The teeth $c^1$ on the locking member C slide over the teeth on the member $b^2$ until the locking member engages the reinforcement rod A and locks it into position, with steadying arms $c^2$ extending forwardly and/or rearwardly to rest on the rod A. This condition is shown in FIG. 2. Due to the inclination of the teeth the locking member C is retained in position and will accommodate rods A of varying diameters up to the width of the slot.

The lower surface of the locking member is preferably of truncated triangular or semi circular shape to engage the periphery of the reinforcement rod A. The locking member C is formed with a central aperture $C^3$ to receive a support rod such as that at $d^3$ in FIGS. 5 and 6.

The disc may be for example 75 mm. in diameter with a 5 mm. rim. The U shaped member may be 40 mm. in width with a 25 mm. slot between the legs and with 1 mm. high teeth pitched at 20 teeth per 25 mm.

Figures 3, 4:
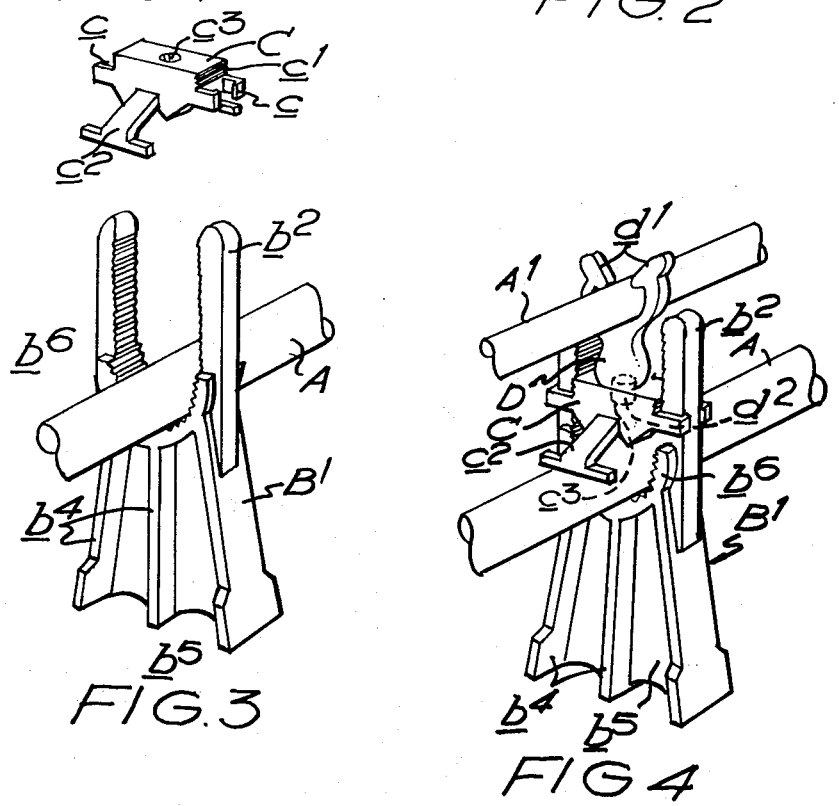
FIGS. 3 and 4 are similar views of two further forms of spacer.

In the form shown in FIG. 3 the spacing member $B^1$ is moulded as a stand with legs $b^4$ joined by webs $b^5$ supporting the U shaped member $b^2$ to receive the locking member C when the reinforcement rod A has been inserted into the U shaped member the base $b^6$ of which may be reinforced.

As shown in FIGS. 3 and 4 the central aperture $c^3$ receives a leg $d^2$ projecting down from a support member D having resilient arms or wings $d^1$ to receive a second reinforcement rod $A^1$ lying parallel with the rod A.

Figure 5:
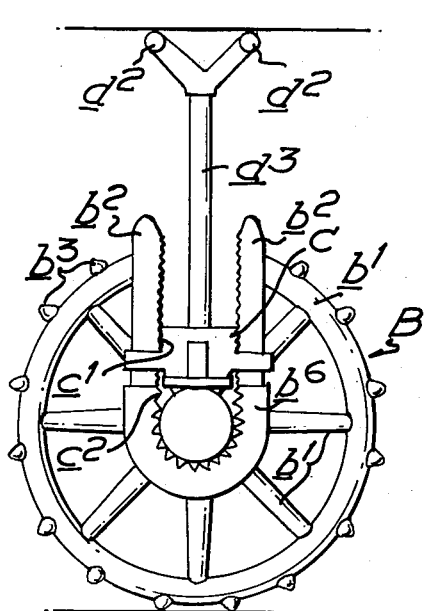
FIGS. 5 and 6 are side elevations of a further two forms of spacer.

In the construction shown in FIG. 5 the disc B shown in FIG. 1 is supported in position against the opposite sides of a tube or other concrete structure by feet $d^2$ carried on a rod $d^3$ inserted into the aperture $c^3$ in the anchoring member C, the rod $d^3$ being cut to length according to the spacing of the feet $d^2$.

The main but not only use of such a device is in columns, walls or other vertically reinforced structures where if the reinforcement member A is not located from two essentially opposite points it may move out of position during concrete pouring operations.

A plurality of spacing members and locking members may be employed in echelon with one disc B overlapping and adjacent disc to position a plurality of reinforcement rods A, the locking member C of the discs B being connected by rods $d^3$ to position all the discs. The arms $c^2$ or rods $d^3$ may be moulded integrally with the locking members.

Figure 6:
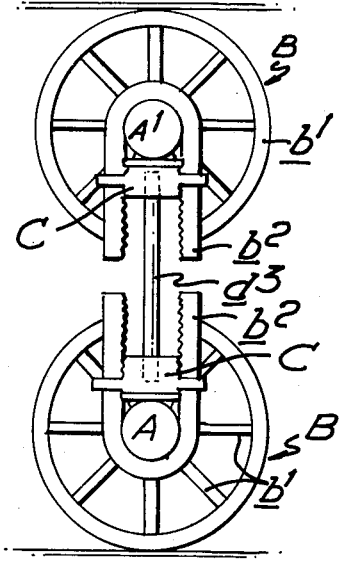

In the forms shown in FIG. 6 for supporting two reinforcement rods A $A^1$ two discs B are employed spaced apart by a rod $d^3$ entering the apertures $c^3$ in each anchoring member C. The use of the extension rods $d^3$ locked in the anchor members C gives a positive secondary location at any desired angle for the secondary anchor member C and the spacer B.

Figure 7:
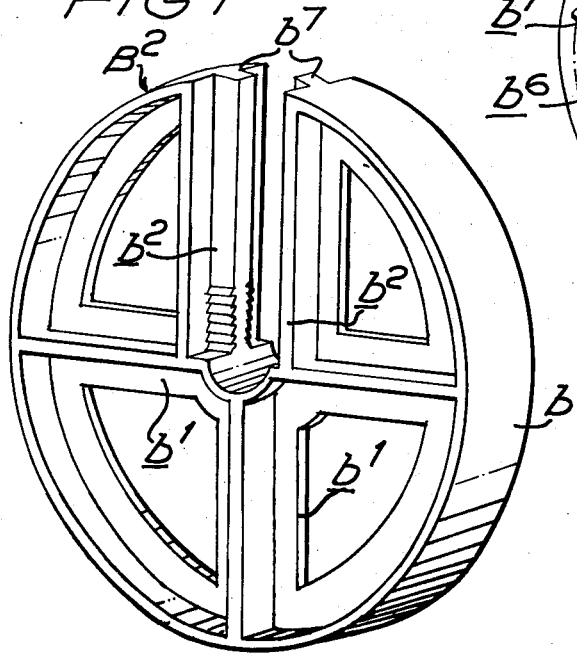
FIG. 7 is a perspective view of a still further form of spacer.
Figure 8:
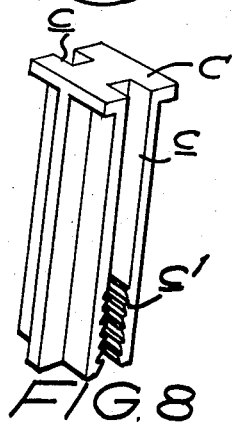
FIG. 8 is a perspective view of the anchoring or locking member.

In the arrangement shown in FIGS. 7 and 8 a spacer $B^2$ is moulded with the U shaped member $b^2$ integral with the rim $b$, ribs $b^7$ of the U-shaped portion being provided for engagement in the slots $c$ in the anchoring member C the teeth $c^1$ being formed internally on the sides of the slots C.

Figure 9:
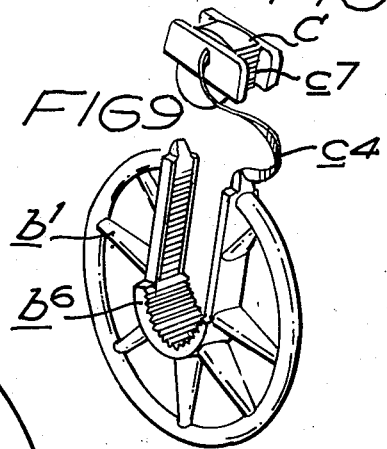
FIG. 9 is a perspective view showing the spacer illustrated in FIG. 1 with the anchoring or locking member secured thereto.

As shown in FIG. 9 the anchoring member C may be attached to the spacer B, $B^1$ or $B^2$ by a strap $c^4$ in order to prevent separation from the spacer.

What we claim is:

1. A spacer device for mounting a relatively rigid reinforcement rod in concrete comprising a mounting member formed with a U-shaped portion having an arcuate rod receiving inner end section and parallel legs extending outwardly to an open end, a locking member adapted to be introduced through said open end into engagement with a rod at said inner end, cooperating inter-engaged slide guide means on said locking member and said legs comprising oppositely open end slots on said locking member within which said legs are slidably received, cooperating locking teeth on said locking member and said legs comprising a series of teeth on the inner faces of both of said legs and cooperating series of teeth at the base of each slot on the locking member, and oppositely projecting steadying arms on said locking member adapted to bear at their outer ends on a rod received in said arcuate inner end section of said mounting member.

2. The spacer device defined in claim 1, wherein said mounting member is an integral molded plastic unit, and said locking member is an integral molded plastic unit.

3. The spacer device defined in claim 1, wherein said mounting member is formed with a substantially circular rim, with said arcuate section substantially concentric with said rim and connected thereto by a plurality of radial spokes, and said opening being a gap in the periphery of said rim.

4. The spacer device defined in claim 1, wherein said locking member is formed with an external recess adapted to receiving a supporting member for an adjacent reenforcement rod.

5. The spacer device defined in claim 1, wherein said mounting and locking members are connected by a flexible strap that prevents accidental separation and permits operational insertion of the locking member into the mounting member.

6. A spacer device produced from plastics material for supporting relatively rigid reinforcement rods in concrete comprising the combination of a rod mounting member and a locking member, the mounting member incorporating a U-shaped portion having legs formed with projections for locking engagement with corresponding projections on the locking member for securing the reinforcement rod in position on the mounting member, said locking member being formed with a slot in each end to slide over the legs of the U-shaped portion to prevent sideways movement thereof and with a pair of oppositely projecting resilient arms extending to engage a reinforcement rod passing through said U-shaped portion on each side of the locking member to resiliently grip the rod at that side.

* * * * *